US012421389B2

(12) United States Patent
Väisänen et al.

(10) Patent No.: US 12,421,389 B2
(45) Date of Patent: Sep. 23, 2025

(54) COMPOSTABLE WOOD COMPOSITE MATERIAL FOR THIN-WALLED ARTICLES

(71) Applicant: Sulapac Oy, Helsinki (FI)

(72) Inventors: Taneli Väisänen, Helsinki (FI); Antti Pärssinen, Helsinki (FI)

(73) Assignee: SULAPACOY, Helsinki (FI)

( * ) Notice: Subject to any disclaimer, the term of this patent is extended or adjusted under 35 U.S.C. 154(b) by 807 days.

(21) Appl. No.: 17/298,834

(22) PCT Filed: Dec. 2, 2019

(86) PCT No.: PCT/FI2019/050863
§ 371 (c)(1),
(2) Date: Jun. 1, 2021

(87) PCT Pub. No.: WO2020/115363
PCT Pub. Date: Jun. 11, 2020

(65) Prior Publication Data
US 2022/0033648 A1 Feb. 3, 2022

(30) Foreign Application Priority Data
Dec. 2, 2018 (FI) .................................. 20186033

(51) Int. Cl.
*C08L 67/04* (2006.01)
*A47G 21/18* (2006.01)
*C08J 5/06* (2006.01)

(52) U.S. Cl.
CPC .............. *C08L 67/04* (2013.01); *A47G 21/18* (2013.01); *C08J 5/06* (2013.01); *C08L 2201/06* (2013.01); *C08L 2207/20* (2013.01)

(58) Field of Classification Search
CPC .... C08L 67/04; C08L 1/00; C08L 1/14; C08L 101/00; C08L 101/16; C08L 67/00; C08L 97/02; C08J 5/06; C08J 5/04
See application file for complete search history.

(56) References Cited

U.S. PATENT DOCUMENTS 2,888,323 A   5/1959  Teichner
5,738,921 A   4/1998  Andersen et al.
(Continued)

FOREIGN PATENT DOCUMENTS

CN   101429328 A   5/2009
CN   108473712 A   8/2018
(Continued)

OTHER PUBLICATIONS

Jiang et al: Effect of Woodflour Content on Mechanical Properties of Woodflour/PE-HD Composites, Journal of Taishan Medical College, 2007, vol. 28, No. 4.
(Continued)

*Primary Examiner* — Lynda Salvatore
(74) *Attorney, Agent, or Firm* — Timothy H. Van Dyke; Wolter, Van Dyke Davis, PLLC

(57) ABSTRACT

A composition comprising a continuous thermoplastic polymer matrix having a melting point greater than 110° C. and, distributed within the matrix, particles of hydrophilic natural fiber material having a sieved size of less than 1.0 mm, the weight ratio of the thermoplastic polymer to the wood particles being from 99:1 to 35:65. An improvement in biodegradability of biopolymers, such as PLA, can be achieved. On the other hand, the addition of wood fibers enhances the material's ability to resist thermal deformation. The present compositions can be used for manufacturing hollow structures, by injection blow molding, of bottles with a wall thickness between 0.1 mm and 5 mm, in particular from 0.3 to 1 mm or continuous extruded products with a wall thickness from 0.3 mm to 1.5 mm.

26 Claims, 3 Drawing Sheets

(56) References Cited

U.S. PATENT DOCUMENTS

| | | |
|---|---|---|
| 6,168,857 B1 | 1/2001 | Andersen et al. |
| 8,455,575 B2 | 6/2013 | Yao |
| 2003/0216492 A1 | 11/2003 | Bowden et al. |
| 2010/0071528 A1 | 3/2010 | Viereck et al. |
| 2012/0283363 A1 | 11/2012 | Kumamoto et al. |
| 2015/0218368 A1 | 8/2015 | Bussmann et al. |
| 2018/0215914 A1 | 8/2018 | Orts et al. |

FOREIGN PATENT DOCUMENTS

| | | | |
|---|---|---|---|
| EP | 2799491 A1 | 11/2014 | |
| JP | 3933315 A | 5/1999 | |
| JP | 3423094 B2 | 7/2003 | |
| JP | 2004359939 A | 12/2004 | |
| JP | 200514626 A | 6/2005 | |
| JP | 2005146261 A | 6/2005 | |
| JP | 2008037022 A | 2/2008 | |
| JP | 2010270290 A | 12/2010 | |
| JP | 4699568 B2 | 6/2011 | |
| JP | 2014015531 A | 1/2014 | |
| JP | 2018154725 A | 10/2018 | |
| NO | 315204 B1 * | 7/2003 | ............ A61L 15/26 |
| WO | WO2006001717 A1 | 1/2006 | |
| WO | WO2007095709 A1 | 8/2007 | |
| WO | WO-2010103186 A2 * | 9/2010 | ............ A43B 17/003 |
| WO | WO2014015611 A1 | 1/2014 | |
| WO | WO2018020485 A1 | 2/2018 | |
| WO | WO2018158506 A1 | 9/2018 | |

OTHER PUBLICATIONS

Bhattacharjee et al: Feasibility of Reprocessing Natural Fiber Filled Poly(lactic acid) Composites: An In-Depth Investigation. Advances in Materials Science and Engineering, Jul. 27, 2017, vol. 2017, pp. 1-10.

Hietala et al: Processing of wood chip-plastic composites: effect on wood particle size, microstructure and mechanical properties. Plastics, Rubber & Composites: Macromolecular Engineering, Mar. 1, 2011, vol. 40, No. 2, pp. 49-56.

Immonen: Ligno-Cellulose Fibre Poly(Lactic Acid) Interfaces in Biocomposites. Nov. 23, 2018, pp. 1-123.

Lee et al: Thermal and Mechanical Properties of Wood Flour/Talc-filled Polylactic Acid Composites: Effect of Filler Content and Coupling Treatment. Journal of Thermoplastic Composite Materials. May 2008, vol. 21, pp. 209-223.

Lin et al: The effect of alkali treatment on properties of dopamine modification of bamboo fiber/polylactic acid composites. Polymers, Apr. 4, 2018, vol. 403, No. 10, pp. 1-12.

Official Journal of the European Union: Commission Regulation. (EU) No. 10/2011 of Jan. 14, 2011 on plastic materials and articles intended to come into contact with food, pp. 1-89.

Product-Specification 00198. PLA—Poly-lactic acid. pp. 1-18.

Teymoorzadeh et al: Biocomposites of Wood Flour and Polylactic Acid: Processing and Properties. Journal of biobased material and bioenergy. American Science Publishers, 2015, vol. 9, No. 2, pp. 1-6.

* cited by examiner

COMPOSTABLE WOOD COMPOSITE MATERIAL FOR THIN-WALLED ARTICLES

FIELD OF INVENTION

The present invention relates to compostable composite materials. In particular the invention concerns compostable wood composite materials and methods of producing the same. The present invention also concerns the use of wood composite materials in thin-walled articles.

BACKGROUND

The growing awareness of environmental issues and scarcity of resources has increased the interest surrounding the use of bio-based materials in a large number of applications. On legislative level, the more stringent policies have forced many industries to seek or develop new materials from renewable sources for replacing the traditional materials derived from non-renewable fossil resources.

One of the most prominent challenges during the recent decades has been the accumulation of plastics in the environment, especially in the oceans. This is mostly due to poor waste treatment processes, which result in leakage of debris from the waste treatment facilities to the environment. The plastic debris in the oceans poses a considerable threat to marine animals, which could eventually result in catastrophic events in the marine ecosystems. In October 2018, European Parliament approved a ban on plastic cutlery and plates, cotton buds, straws, drink-stirrers and balloon sticks. At the time of the decision, the EU hoped that the ban will go into effect across the bloc by 2021. The consumption of other items that have no other existing material alternatives (such as burger boxes and sandwich wrappers) will still have to be reduced by 25% in each country by 2025. Another target is to ensure that 90% of all plastic drink bottles are collected for recycling by 2025.

Various types of approaches have been suggested to improve the degradability of polymeric materials. One possible way is to substitute biodegradable or non-biodegradable polymers with cellulose-based materials, such as cardboard. Unfortunately, although these materials provide ecological benefits, they are unsatisfactory in many respects as substitutes for polymers. For example, the mechanical durability of these materials in moist environments is not sufficient and they lack good barrier properties. Another possibility is to modify the properties of the polymers so that they degrade faster, which is usually done through addition of various types of additives into the polymer. This has led to the development of oxo-degradable polymers, for example. Even though these polymers certainly degrade faster in the macro scale, the problem of the accumulation of micro-sized polymer particles, i.e., microplastics, in the environment still remains.

By definition, microplastics are plastic particles with a physical size less than 5 mm in diameter, and they can be further divided into primary and secondary microplastics. Primary microplastic is any plastic particle that is already less than 5 mm in size before it enters the environments. This type of microplastics can be found in cosmetic products or clothing, for example. Secondary microplastics stem from the natural degradation process of larger plastic articles once they enter the environment. Secondary microplastics can therefore originate from, e.g., plastics bags or drinking bottles.

It is therefore evident that there is an urgent need for more efficient waste treatment processes.

To eliminate the environmental problems associated with petroleum based, non-biodegradable and single-use plastics, an extensive amount of research has been conducted to develop biodegradable polymers with similar characteristics when compared with non-degradable counterparts. This has led to the development of a large number of polymers, such as polylactic acid (PLA), polycaprolactone (PCL), polyhydroxybutyrate (PHB), polybutylene adipate terephthalate (PBAT), polybutylene succinate (PBS), and blends of them, and to the use of the polymers in various articles.

Thus, JP4699568B2 concerns a method of manufacturing a thin-walled container having a thickness in a range of 0.3 to 0.7 mm. The polymer used is PLA which may contain inorganic fillers in amounts of 1-28 w %.

US210071528B2 discloses a stiffened thin-walled fiber composite products and a method of making the same types of fibers, including natural fibers, as reinforcements.

CN101429328A presents a material that can be used for producing natural degradable deep-cavity thin-wall soft bottle for tableware and soft bottle thereof. The material consists of 85-90 w % of PLA, 9-14 w % of polyethylene terephthalate (PET), the rest of the material consisting of PET additives. The thickness of the bottle walls is 0.07-0.09 mm.

US20030216492A1 discloses a material based on starch obtained from, e.g., potato, paper or corn. The properties of the material are modified through addition of wood flour or fibers (aspect ratio between 1:2 and 1:8) to the starch suspension. The addition of wood fibers makes the material moldable. The molded article is made waterproof by applying a liquid-resistant coating (e.g., PROTECoat, Zein®, PLA . . . ) to the product. These products can be used as cups, trays, bowls, utensils or plates. The thickness of the articles can range between 0.001 mm and 10 mm. Other starch-based materials are described in U.S. Pat. No. 6,168,857B1.

Compositions and methods for manufacturing sealable, liquid-tight containers comprising an inorganically filled matrix are described in U.S. Pat. No. 5,738,921A. The containers have a liquid-tight barrier, which consists of an organic polymer binder (PLA or starch), an inorganic aggregate filler having a concentration range from about 20% to about 90%, and a fibrous material (such as wood fibers). The size of the organic particles was not determined.

U.S. Pat. No. 8,455,575 describes a material consisting of wood powder (size from 1 μm to about 5 mm) and PLA. In addition to these components, condensed phosphate ester is included in the composition.

Finally, EP2888323B1 discloses polymer mixtures for the production of thin-walled injection molded parts having a wall thickness of from 0.3 to 0.8 mm. The materials used are aliphatic-aromatic polyesters (e.g., PLA), organic materials, such as wood fibers, and commonly used additives.

Despite their advantageous properties especially in terms of biodegradability, biodegradable plastics as known in the art degrade slowly when the thickness of the article is greater than 1 mm and when they are exposed to cold and dry conditions.

It is therefore necessary to process such biodegradable plastics in waste treatment facilities where they are exposed to elevated temperatures (e.g., over 60° C.) and higher humidity levels (e.g., over 80%) to accelerate their degradation process.

Several studies have shown that even when the wall thickness of products made from biodegradable polymers, such as PLA, is kept at around 1 mm, their biodegradation in lakes or in the sea may still take an excessive amount of time (i.e., years) and therefore the known materials cannot be characterized as truly marine degradable.

SUMMARY OF THE INVENTION

It is an aim of the present invention to eliminate at least a part of the disadvantages of the prior art and to provide a new composite material suitable for use in thin-walled articles.

It is another aim of the present invention to provide novel thin-walled articles.

The present invention is based on the concept of incorporating biodegradable reinforcements into the material for increasing the water absorption of the material while also improving its mechanical properties.

Thus, in one embodiment, the present invention comprises a combination of natural hydrophilic particles, such as coarse wood particles, and at least one biodegradable polymer to form a composition. In the composition the hydrophilic particles are mixed with and preferably throughout the polymer(s). Swelling of the hydrophilic particles due to water absorption has enough force to form cracks into the polymer matrix, thus enabling the water to penetrate the material more efficiently and therefore accelerate the material degradation. When the material degrades, the long polymer chains will break down into shorter chain fractions that will eventually degrade into natural compounds, such as carbon dioxide ($CO_2$), water, biomass and inorganic compounds, leaving no residual plastic particles, such as microplastics, or toxic residues in the environment.

In one embodiment, the hydrophilic particles comprise or consist of or consist essentially of wood particles, such as fibers, with a particle size equal to or less than 0.5 mm (sieved size).

The products, for which the present material is particularly suitable, have a wall thickness equal to or less than about 1.5 mm, in particular equal to or less than 1 mm, and preferably at least 0.1 mm, for example at least 0.4 mm.

The present invention will provide a material with a capability to degrade fast in a composting environment and also to have enough rigidity to be utilized in a large number of applications. The products of interest include containers and other hollow articles, such as straws and other thin-walled pipes and tubes, in which biodegradability is combined with mechanical strength properties.

The articles can be produced conventional melt processing methods, such as injection molding or extrusion.

More specifically, the present invention is characterized by what is stated in the characterizing part of the independent claims.

Considerable advantages are obtained by the invention. Thus, as discussed above, whereas traditional biodegradable polymers, such as PLA, polyglycolic acid (PGA) and PBAT, when shaped into articles having a thickness of less than 1 mm, are only biodegradable in marine environment at a biodegradation speed in the order of typically several years or even decades, the present materials degrade faster and provide good degradation also at temperatures below 40° C. in lakes and seas and similar marine environments.

When compared with the current solutions used to produce biodegradable thin-walled products, clear advantages of articles of the present invention include not only greater biodegradation rate but also better aesthetics. The present materials also provide good processability and better dimensional stability especially in moist and warm environments. Tests show that a significant improvement in the moduli of the material after the addition of wood fibers can be achieved. In addition to the betterment in the compostability and water absorption behavior, the inclusion of wood fibers improves the ductility of the material as well.

By contrast, use of biodegradable polymers alone to produce products with a wall thickness 1 mm results in products with mechanical properties which are insufficient for many applications and high price.

Furthermore, the inclusion in the present articles of natural fibers as disclosed herein results in more ecological value-added material in terms of decreased carbon footprint and utilization of side streams by-products that would otherwise be discarded or used as energy source.

The present compositions can be easily manufactured into articles using injection molding or extrusion without any extra expenses in form of acquisition of new machinery, i.e., the present materials can be processed with existing machinery.

In the following, embodiments of the invention will be more closely examined with a detailed description and referring to the drawings attached.

EMBODIMENTS

Figure 1:
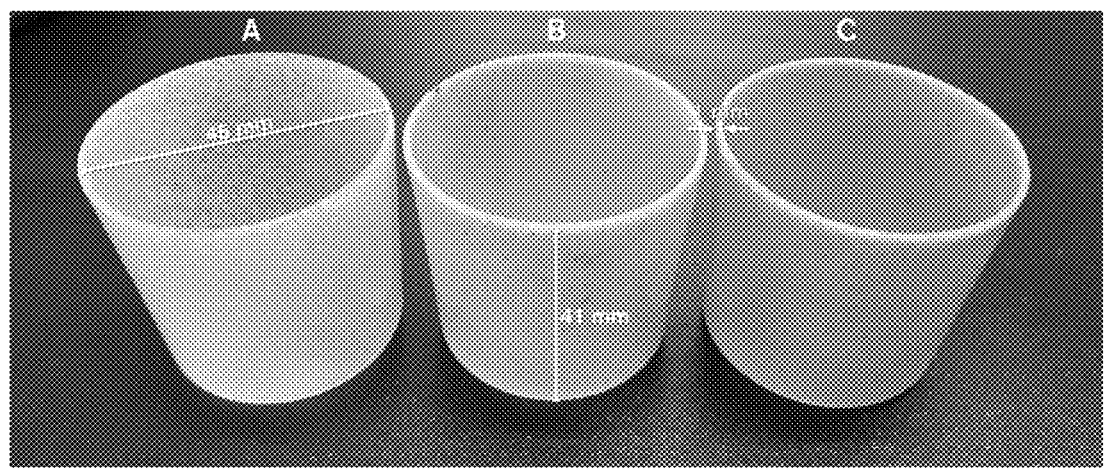
FIG. 1 is a photograph of a thin-walled cup-like product with three different wood fiber contents (10 w %, 20 w % and 30 w %) after production. The figure indicates the physical dimensions for the product.

The present invention provides novel biocomposites which are suitable for use in thin-walled articles.

In this context, the term "thin-walled articles" stands for products having a wall thickness equal to or less than about 1.5 mm, in particular equal to or less than 1 mm, and preferably greater than 0.1 mm.

"Biocomposites" are composite materials formed by a reinforcement of natural fibers in a polymer matrix. "Composite material", is defined as a material comprising, or consisting of, or consisting essentially of, two or more constituents with significantly different chemical or physical properties, and in which the constituents remain separate and distinct within the finished structure. As a result, the characteristics of the composite materials are different when compared with their individual constituents.

The combination of biodegradable polymers with natural fibers, in particular wood fibers as disclosed herein, provides multiple advantages, such as lower price, improved mechanical durability, natural appearance, and lighter weight of the article when compared with the corresponding pieces made from biodegradable polymers. In addition, and in particular, the present materials are useful for producing articles which exhibit degradability in aqueous conditions, in particular in marine conditions.

In the present context, the terms "marine degradability" or "marine degradable" and "degradable in sea or lake conditions", respectively, are interchangeably used to designate a property of the present compositions and of articles made thereof to degrade in freshwater or salt water at conditions prevailing in seas and lakes. These conditions can be referred to as "ambient conditions". Typically, the present materials and articles will be subjected to aerobic biodegradation for instance in the seawater/sediment interface. Such degradability can be assessed using standards ISO 18830 and ISO 19679. Marine degradability can also be assessed the ASTM D6691-17 test method for determining aerobic biodegradation of plastic materials in the marine environment by a defined microbial consortium or natural sea water inoculum.

In one embodiment, the present compositions have a density in the range from 0.8 to 1.4 $g/cm^3$ (800 to 1400 $kg/m^3$). In one particular embodiment, the present compositions have a density greater than 1 $g/cm^3$ (greater than 1000 $kg/m^3$) which means that the articles made from them are "non-floating".

In the present context, unless otherwise indicated, any percentages are given as weight percentages calculated from the whole weight of the entity in question.

"Molar mass" and "molecular weight" refer to weight average molecular weight (Mw), unless otherwise indicated.

"Room temperature" stands for a temperature of 15 to 30° C., in particular 15 to 25° C., for example about 23° C.

The present compositions comprise generally a biodegradable polymer, typically a thermoplastic polymer, mixed with hydrophilic particles of vegetable origin. The particles can be fibrous.

In one embodiment, the present composition comprises
a continuous thermoplastic polymer matrix having a melting point greater than 110° C., in particular greater than 150° C. and,
distributed within the matrix, hydrophilic particles having a sieved size equal to or less than 1.0 mm.

"Distributed" within means that the particles are mixed with the polymer such that they are present generally throughout the matrix. In particular, they are evenly or homogeneously distributed within the matrix.

In one embodiment, the hydrophilic particles are of a natural fiber material, in particular of vegetable origin, having a sieved size of less than 1.0 mm.

The chemical structure of the fiber used in the present compositions is typically based on three main chemical polymeric components: cellulose, hemicelluloses and lignin.

Typically, the most abundant component in the natural fibers is cellulose, which constitutes about 26-83 w % of the total mass of the fibers. Cellulose can be further classified into amorphous and crystalline cellulose based on the type of the internal molecular structure inside the molecule; amorphous cellulose molecules lack the long-range order whereas crystalline cellulose has a highly oriented microscopic structure. The amorphous regions within the large cellulose molecules account for the hydrophilicity since there are plenty of free hydroxyl groups (—OH) inside the non-oriented and loose polymer structure, with which water molecules can form hydrogen bonds. This is not the case for crystalline cellulose since there are no free —OH-groups available for water molecules to form bonds with because of the highly ordered structure that encapsulates these groups.

Hemicelluloses are a family of several heteropolymers, including xylan, glucomannan, arabinoxylan and xyloglucan, and they constitute about 12-39 w % of the total mass of natural fibers. The hydrophilicity of natural fibers can be primarily accounted to hemicelluloses because they consist of considerably shorter and branched sugar unit chains (500-3,000 units) as opposed to mainly unbranched cellulose (7,000-15,000 units) molecules. Thus, the —OH-groups in the molecular structure are more freely available for water molecules to form hydrogen bonds with.

Lignins are also molecules with a complex structure as they consist of several types of heteropolymers. The structure of lignin is heterogeneous and it lacks a defined primary structure. Lignin acts as a "glue" in natural fibers as it binds cellulose chains together with hemicelluloses. In contrast to the chemical nature of cellulose and hemicelluloses, lignin is hydrophobic and it is rich in aromatic subunits. Three main components have been identified from lignin: p-coumaryl alcohol, coniferyl alcohol and sinapyl alcohol.

Suitable natural fiber materials can be obtained directly from lignocellulosic materials, animals, or from industrial process by-products or side streams. Examples of this kind of materials include annual or perennial plants or wooden materials, such as flax, hemp, jute, coir, cotton, sisal, kenaf, bamboo, grass, hay, straw, rice, soybeans, grass seeds as well as crushed seed hulls from cereal grains, in particular of oat, wheat, rye and barley, and coconut shells. In addition, wool, feather and silk can be utilized.

The wood materials can be derived from softwood or hardwood such as pines, spruces, larches, cedars, birch species, alders, aspens, poplars, *eucalyptus* species and tropical wood species. In a preferred embodiment, the wood material is selected from both hardwood and softwood, in particular from hardwood of the *Populus* species, such as poplar or aspen, or softwood of the genus *Pinus* or *Picea*, such as spruce or pine.

In an embodiment, the hydrophilic fiber material comprises particles having a sieved size of 1 mm or less. Thus, in one embodiment, at least 70%, preferably at least 80%, typically 80 to 95%, by weight of the particles have a sieved size in the range of 0.1 to 1 mm, in particular 0.3 to 0.95 mm.

In case of using a wood material as source of the hydrophilic particles of the composition, suitable particles can be obtained for example by mechanical processing, such as crushing, grinding, chipping, sawing or refining of a wood material. In one embodiment, the material primarily is formed by a finely divided wood material. Such a material can be characterized as "saw dust" or "wood flour".

In one embodiment, the material comprises, consists of or consists essentially of wood fibers.

In one embodiment, the material comprises, consists of or consists essentially of wood particles.

In one embodiment, the material comprises, consists of or consists essentially of mixtures of wood fibers and wood particles.

In the present context, "fibers" typically have an aspect ratio of 6:1 or more, such as 10:1 or more, or even 15:1 or more.

In one embodiment, the material contains particles having a cubical shape.

In one embodiment, the material contains wood particles having a non-cubical shape. Such particles can be characterized as being chips, such particles typically being "platy" or "slate-like" of "flat" or "flat-shaped". In an embodiment of the invention, the wood particles of such a shape are obtained by chipping of wood raw-material. In the present context, wood particles are considered to be wood chips when they have a generally planar structure with a cross-sectional thickness of the planes that is typically less than 40%, in particular less than 25%, for example less than 10%, of the largest dimension of the planar surface of the particles.

Typically, by mechanical processing of wood, for example by crushing, grinding, chipping, sawing or refining, a finely divided matter is obtained which contains particles having a variety of shapes including fibrous, cubical and non-cubical. In one embodiment, the composition include particles having a non-cubical shape, in particular chips (size equal to or preferably less than 1 mm), along with saw dust and wood flour (size equal to or, preferably, less than 1 mm). In one embodiment, a majority of the volume of the wood particles are cubical particles (i.e. they are saw dust or wood flour particles; they are not non-cubical in general shape), or fibers, or a combination of cubical particles and fibers. In an embodiment, particles of untreated (for example "virgin") wood are used. Such particles have been prepared from untreated wood for example by mechanically grinding or chipping.

In one embodiment, no chemical or thermal treatment has been carried out on the particles before or after grinding or chipping.

In an embodiment, the thermoplastic polymer has melting point greater than about 150° C., in particular greater than about 155° C. The thermoplastic polymer can in particular be selected from the group of biodegradable polymers, such as polyesters, including polylactide and poly(lactic acid), polyglycolide and poly(glycolic acid), cellulose acetate propionate, or polyhydroxyalkanoate, e.g. polyhydroxybutyrate, although non-biodegradable polymers, such as polyolefins, polyesters, in particular biodegradable polyesters, polyamides, polyimides can be employed as well for achieving composite materials filled with wood particles as herein described.

In a preferred embodiment, the thermoplastic polymer is selected from the group of biodegradable polymers, such as polyesters, including polylactide and poly(lactic acid), polyglycolide and poly(glycolic acid) or cellulose acetate propionate.

The molecular weight of the biodegradable polymer should be sufficiently high to enable entanglement between polymer molecules and yet low enough to be melt processed.

In one embodiment, polylactic acid or polylactide (which both are referred to by the abbreviation "PLA") is employed. One particularly preferred embodiment comprises using PLA polymers or copolymers which have weight average molecular weights (Mw) of from about 10,000 g/mol to about 600,000 g/mol, preferably below about 500,000 g/mol or about 400,000 g/mol, more preferably from about 50,000 g/mol to about 300,000 g/mol or about 30,000 g/mol to about 400,000 g/mol, and most preferably from about 100,000 g/mol to about 250,000 g/mol, or from about 50,000 g/mol to about 200,000 g/mol.

When using PLA, it is preferred that the PLA is in the semi-crystalline or partially crystalline form. To form semi-crystalline PLA, it is preferred that at least about 90 mole percent of the repeating units in the polylactide be one of either L- or D-lactide, and even more preferred at least about 95 mole percent.

In another embodiment, the thermoplastic polymer has a melting point in the range of about 110 to 120° C. Such a thermoplastic can be selected from polybutylene adipate terephtalates (also abbreviated PBAT).

This kind of thermoplastic polymer can comprise a neat polymer either in the form of a homopolymer or a copolymer, for example a random copolymer, such as a copolyester of adipic acid, 1,4-butanediol and dimethyl terephthalate.

PBAT polymers are typically biodegradable, statistical, aliphatic-aromatic copolyesters. Suitable materials are supplied by BASF under the tradename Ecoflex®. The polymer properties of the PBAT are similar to PE-LD because of its high molecular weight and its long chain branched molecular structure.

PBAT is classified as a random copolymer due to its random structure. This also means that it cannot crystallize to any significant degree due to the wide absence of any kind of structural order. This leads to several physical properties: wide melting point, low modulus and stiffness, but high flexibility and toughness.

In addition to virgin polymers, the composition may also contain recycled polymer materials, in particular recycled biodegradable polymers. Furthermore, the composition may also contain composites of polyesters, such as fiber reinforced PLA, ceramic materials and glass materials (e.g. bioglass, phosphate glass).

In an embodiment of the present technology, the composition comprises a polymer matrix with a melting point greater than 90° C. or melt flow rate of from 1 to 70 g/10 min, in particular 1 to 30 g/10 min (MFR, 190° C./2.16 kg). In particular the polymer matrix having the afore-said properties comprises, consists of or consists essentially of poly(lactic acid) or polylactide or copolymers thereof. In particular the polymer comprises homopolymers of polylactide or poly(lactic acid).

In one embodiment, the composite material has an MFR between 1 and 50 g/10 min, in particular in the range of 1 to 30 g/10 min (190° C./2.16 kg), in particular in the range of 1-30 g/10 min.

The hydrophilic natural fibers or particles, which are capable of swelling inside the matrix upon the exposure to water, are distributed throughout the matrix. In one embodiment, the particles are homogeneously distributed inside the matrix. This means that there is at least 1 particle, preferably at least 2, in particular at least 5 particles, present within each $mm^3$ of the material.

In one embodiment, these fibers or particles are preferably formed from non-fibrillated wood particles having a sieved size equal to or less than 1.0 mm. In addition, at least a part of the wood particles is present in the form of flat-shaped wood chips. The product is thin-walled, i.e., it has a total wall thickness of equal to or less than 1.5 mm.

The ratio of thermoplastic polymer to natural fiber particles (e.g., wood) by weight is typically 35:65 to 99:1. In a preferred embodiment, the composite comprises 1 to 60%, in particular 10 to 30% by weight of natural fiber particles from the total weight of the thermoplastic polymer and the natural fiber particles. Thus, in preferred embodiment, the weight ratio of thermoplastic polymer to wood particles is from 65:35 to 95:5, in particular 70:30 to 90:10.

In order to achieve a satisfying surface quality and mechanical performance for the injection molded product, the raw materials used in the processing need to be dried prior to processing. If the moisture content in the raw materials is too high, the water will evaporate from the materials during processing, resulting in the formation of pores and streaks in the product. This, in turn, can deteriorate the material properties.

The moisture content in the natural fibers is reduced to less than 2% before processing, for example below 0.025% calculated from the total weight of the natural fibers, and the water content in the thermoplastic polymer, in particular biodegradable polymer or biopolymer, such as PLA, is reduced to less than 0.05%, in particular below 0.025%, respectively, of the total weight of the biodegradable polymer or biopolymer.

In an embodiment, the first composition can further contain mineral fillers, such as talc, calcium carbonate ($CaCO_3$) or kaolin. Other possible fillers are formed from silica. The typical content of mineral fillers, if any, amounts from about 0.1 to 40 w %, in particular from about 1 to 20 w %. Other mineral fillers and pigments may also be present in the first composition. Further examples of mineral fillers and pigments are calcium sulphate, barium sulphate, zinc sulphate, titanium dioxide, aluminium oxides, and aluminosilicates.

In an embodiment, the composite further contains particles of finely divided material giving color properties to the composite. The dying material can, for example, be selected from bio-based materials having an adequate stability at the melt processing temperatures, which can be up to 210° C. Examples of the dying materials suitable for this application are carbon black (black pigment), titanium dioxide ($TiO_2$), iron oxides, copper sulfates and carbonates, chromium oxides, cobalt based compounds and calcium carbonates.

One embodiment comprises using other additives in the composite formulations. For example, maleic anhydride grafted PLA (MA-PLA) can be used to chemically bond wood fibers and polymer matrix together. This results in better mechanical properties of the composite material and also improves the material's resistance to water, which is based on the reduction in the number of free —OH-groups on the surface of the natural fibers. Maleic anhydride can be grafted into all types of biodegradable polymers (e.g., PBAT, PCL . . . ). The amount of used MA-grafted polymers amounts to 1-7 w %, in particular to 1-3 w %.

Oleic acid amides, waxes, metal stearates (e.g., zinc and calcium), mineral fillers (e.g., talc) and lignin can be added to the formulation as a processing aid to improve the processability of the materials for thin-walled applications. Oleic acid amides, waxes and metal stearates are added to reduce the internal friction of the material during extrusion and injection molding. This decreases materials' inherent tendency to thermally degrade during processing and results in better dispersion of wood fibers in the material. In addition, these additives act as mold release agents to ease the release of the finished article from the mold and thus contribute to the better processability of the material. The long fatty chains present in oleic acid amides, waxes, lignin and metal stearates can also decrease the water absorption of the material. Metal stearates and some mineral fillers, such as $CaCO_3$ can also act as acid scavengers to neutralize the acids released from natural fibers and polymers during processing. Lignin is also capable of improving the mechanical properties of the composite.

The typical dosage of oleic amides and waxes is 0.1-7 w %, whereas the amount of metal stearates in the composites is 0.5-7 w %. The amount of used mineral fillers is from 0.1 w % to 20 w %. The dosage of lignin is 0.1-2 w %.

In one embodiment, one or many of the additives presented above are incorporated to the composite formulation with dosage of up to 20 w %, in particular of about 10 w %, preferably approximately 5 w %. The additive or a mixture of additives are added to the mixture of biodegradable polymer(s) and wood chips before further processing and the manufacturing of the product.

In one embodiment, natural fibers are chemically modified in order to reduce the hydrophilicity of the fibers and therefore enhance the chemical compatibility between the fibers and hydrophobic polymer matrix. The chemical modification can be carried out using a chemical reagent, such as acid anhydrides, inorganic acid esters, acid chlorides, and also basic components such as natrium or potassium hydroxide (NaOH or KOH).

In another embodiment, the natural fiber material is modified using steam. Thus, by steam treatment extractives, hemicelluloses and other readily water-soluble compounds are extracted from the natural fibers. The fibers are typically treated at 150-170° C. for at least an hour by feeding steam through the fibers in a pressurized environment.

One embodiment concerns the preparation of produce thin-walled composite materials from thermoplastic polymer having a melting point greater than 110° C., in particular greater than 150° C., and MFR ranging between 1-70 g/10 min (190° C./2.16 kg), in particular between 1-40 g/10 min.

In one embodiment, the polymer is a biodegradable polymer or a mixture of biodegradable polymers, which is being mixed at a mixing ratio of 99:1 to 35:65 by weight with natural fiber particles having a sieved size equal to or less than 1.0 mm.

In an embodiment, the method of producing a composite material comprises the steps of providing a thermoplastic polymer, providing particles of hydrophilic natural fiber material having a sieved size of less than 1.0 mm, and melt-mixing the thermoplastic polymer with the particles hydrophilic natural fiber material at a mixing ratio of 35:65 to 99:1, by weight, to form a composite material melt.

After melt mixing, the melt is typically cooled. In one embodiment, the cooling step is carried out in a mold in which the melt is shaped into an article having a predetermined shape.

In one embodiment, the thermoplastic polymer is fed in the form of finely-divided particles or pellets together with particles of hydrophilic natural fiber material having a sieved size of less than 1.0 mm into the feed zone of a melt-processing polymer processing device. The mixing ratio is preferably 35:65 to 99:1, by weight.

In one embodiment, the thermoplastic polymer is fed to mixing with the particles of the hydrophilic natural fiber material in the form of a neat polymer, as a homo- or copolymer.

In one embodiment, prior to feeding into the hopper of the injection molding or extrusion machine, the mixture can be pelletized to form granulates or pellets.

In another embodiment, the mixture is directly fed without the pelletizing step.

In an embodiment, to prevent the thermal degradation of natural fibers, the processing temperatures during the process are kept below 220° C.

In a further embodiment, to reduce or prevent the degradation of the polymers and natural fibers during the processing, the L/D ratio of the screw used in the injection molding processing is at least 20:1.

In one embodiment, the mold, which determines the shape of the product, is cooled down to temperatures less than $T_g$ of the polymer used. For example, in case of PLA, a mold temperature of about 25-60° C., preferably 35-55° C., is preferred for forming an amorphous product.

In one embodiment, products made from the combination of biodegradable polymer(s) and natural fibers (e.g., wood) are recycled by means of crushing the products mechanically and mixing the crushed materials with dosages from 1 w % to 100 w % to a virgin mixture of biodegradable polymer(s) and natural fibers. The mixture of crushed and virgin material is eventually fed into the hopper of extrusion or injection molding machine to form a new product containing 5-100 w % of recycled material.

In one embodiment, in a container or article which comprises, consists of, or consists essentially of a composition as disclosed in any of the above embodiments, a part of the mixture of thermoplastic polymer(s) and wood fibers is formed by a recycled material formed by a mixture of biodegradable polymer(s) and wood, which is crushed mechanically after injection molding or extrusion, and added to a virgin mixture of the biodegradable polymer(s) and wood. The recycled material amounts to 1 w % to 99 w %, preferably from 5 w % to 20 w %, of the total weight of the composition used for manufacturing the container or article.

In one embodiment, the composition may also contain recycled polymer materials, in particular recycled biodegradable polymers. In addition, the natural fiber used in the composition may also be recycled mechanically and/or chemically.

The present compositions are capable of being processed into sheets or plates having a thickness of not greater than 1.5 mm, in particular not greater than 1.0 mm. Preferably, the thickness is 1 mm or less. Such sheets or plates are typically mechanical integral. They are for example present as walls in containers or other hollow constructions.

In an embodiment, the combination of biodegradable polymer(s) and natural fibers, e.g., wood fibers with a particle size less than 0.5 mm, is used to produce thin-walled bottles by injection blow molding. First, the parison is produced by injection molding according to the process described above, after which the parison is transferred to the blow mold on core pin. Once the blow mold is closed, the material is heated, and air is fed to the core pin (about 3-15 bar), which causes the material to expand in the mold and form the bottle with a predetermined shape. The product is then ejected from the machine. The wall thickness of the bottle can vary between 0.1 mm and 5 mm and the volume range for the final product can be 10-10$^6$ cm$^3$. The suitable natural fiber content for this application is 1-50 w %. The profile of the bottle can be modified by changing the dimensions in the parison mold.

The present materials can be used for manufacturing, by injection blow molding, of bottles with a wall thickness between 0.1 mm and 5 mm, in particular from 0.3 to 1 mm.

In one embodiment, containers or other articles manufactured from the present composites have an overall migration level for 10 w % ethanol of less than 10 mg/dm$^2$ for a wall containing wood fibers between 1 w % and 30 w %.

In one embodiment, the overall migration level for 20 w % ethanol is less than 10 mg/dm$^2$ for a wall containing wood fibers between 1 w % and 30 w %, in particular the overall migration level for 50 w % ethanol is less than 10 mg/dm$^2$ for a wall containing wood fibers between 1 w % and 30 w %, for example the overall migration level for 95 w % ethanol less than 10 mg/dm$^2$ for a wall containing wood fibers between 1 w % and 30 w %.

In one embodiment, containers or other articles manufactured from the present composites have an overall migration level for 3 w % acetic acid of less than 10 mg/dm$^2$ for a wall containing wood fibers between 1 w % and 30 w %.

Generally, the density of the composite material is between 0.8 and 1.4 g/cm$^3$, as discussed above, in embodiments the density is greater than 1 g/cm$^3$ and up to 1.3 g/cm$^3$.

In one embodiment, the Shore D hardness of the composite material is between 60-90.

The following non-limiting examples illustrate embodiments of the present technology.

EXAMPLES

The results from the experimental tests described here confirm the improvement in biodegradability by mixing PLA with natural fibers, i.e., wood. On the other hand, the addition of wood fibers enhances the material's ability to resist thermal deformation. The inclusion of wood fibers also increases the materials' tendency to crystallize, meaning that the glass transition temperature ($T_g$) is decreased, which can be seen as an advantage when the compostability of the material is considered. The specific embodiments of the present invention will now be described with reference to examples.

The first example is a cup-like product with a wall thickness of 1 mm. The height of the cup is 41 mm and diameter approximately 45 mm. FIG. 1 shows photographs of three samples with variable wood fiber contents. The figure gives an example of a thin-walled cup-like product with wood fiber contents of 10 w % (A), 20 w % (B), and 30 w % (C). The physical measures of the product are marked in the photograph. The wood fiber size in this product was equal or less than 0.5 mm. The first test was conducted by immersing the samples in a water bath in a forced-convection oven at 50° C. The results clearly show that the addition of wood fibers lead into a significant improvement in thermal deformation resistance.

Figure 2:
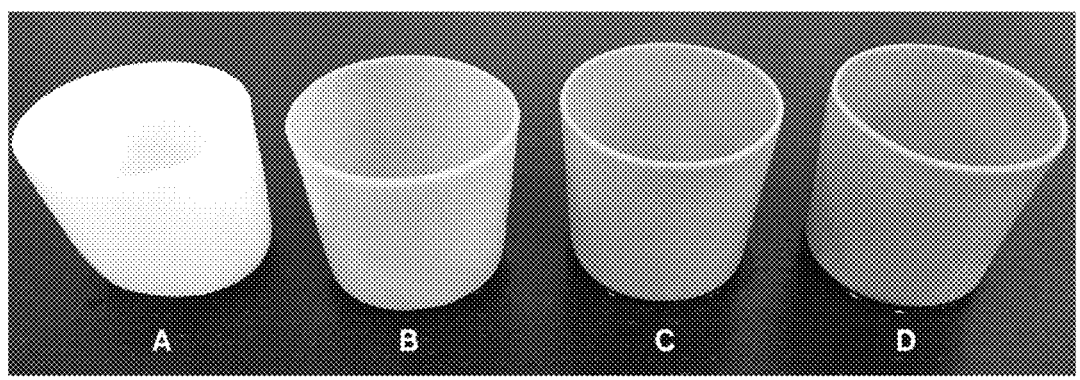
FIG. 2 is a photograph of the thin-walled cup-like product with three different wood fiber contents (10 w %, 20 w % and 30 w %) after being immersed in water bath at 50° C. for 15 days. The figure also includes a product made from PLA as a reference to demonstrate the superior dimensional stability of the products containing wood fibers.

The differences between the samples are shown in FIG. 2 which shows thin-walled cup-like products after being immersed in water bath for 15 days at 50° C. A significant thermal deformation can be seen for a sample containing no wood fibers (A). A minor deformation can also be observed for a sample containing 10 w % (B) of wood fibers. Samples containing 20 w % (C) and 30 w % (D) of wood fibers have maintained their shapes.

Table 1 shows the water absorption values for these materials.

TABLE 1

Water absorption of cup-like products with a wall thickness of 1 mm. The samples were immersed in water at 50° C.

| Wood content (w %) | Weight increase after 8 days (%) | Weight increase after 15 days (%) |
|---|---|---|
| 0 | 2.1 | 2.1 |
| 10 | 4.6 | 5.4 |
| 20 | 7.3 | 7.5 |
| 30 | 11.7 | 13.4 |

The overall migration tests (according to EN 1186-9 and EN 1186-14) were conducted to study the inertness of the thin-walled cup-like products when they were exposed to different simulants. The simulants used in the tests were 10% ethanol (EtOH), 50% EtOH, 95% EtOH and 3% acetic acid. Foods that have a hydrophilic character and are able to extract hydrophilic substances are assigned to 10% EtOH and 3% acetic acid, whereas 50% EtOH is assigned to foods having a lipophilic character and are able to extract lipophilic substances (e.g., milk). Fatty foodstuffs were simulated by using 95% EtOH as a simulant. The test lasted for 10 days at 40° C., which corresponds to any long-term storage at room temperature or below, and it also includes heating up to 70° C. for up to 2 hours or heating up to 100°

C. for up to 15 minutes. The overall migration results for cup-like products are presented in Table 2.

TABLE 2

Overall migration results for cup-like products (N = 3) with different wood contents. According to Regulation (EC) 10/2011 on plastic materials intended for food contact, overall migration should not exceed 10 mg/dm$^2$. If the overall migration limit is exceeded, the number is written in *italics*.

| Wood content (w %) | 10% EtOH (mg/dm$^2$) | 50% EtOH (mg/dm$^2$) | 95% EtOH (mg/dm$^2$) | 3% Acetic acid (mg/dm$^2$) |
|---|---|---|---|---|
| 0 | <2 | <2 | <2 | <2 |
| 10 | <2 | 2.8 | *10.7* | <2 |
| 20 | 4.5 | *11.7* | *32.5* | 5.0 |
| 30 | — | *15.5* | *68.4* | 7.6 |

The results in Table 2 demonstrate that the thin-walled biocomposite products may not be suitable for long-term storage or short-term heating up to 70° C. or 100° C. for 2 hours or 15 minutes, accordingly. However, these products can still be used in applications where a short-term contact with the food stuff occur. Examples of these applications include a cap for a milk or juice container or a drinking straw. It is worth a notice that straws were listed by the EU as products that have to made from other materials than single-use plastics by 2021.

The overall migration tests were also conducted for samples containing 10 w % wood particles and 2 w % PLA-based white masterbatch or 0.5 w % of PLA-based red masterbatch. The results for the tests are summarized in Table 3. The results confirm that the addition of these colors does not have any effect on the migration properties of the materials.

TABLE 3

Overall migration results for cup-like products (N = 3) with 10 w % wood and different PLA-based masterbatch contents. According to Regulation (EC) 10/2011 on plastic materials intended for food contact, overall migration should not exceed 10 mg/dm$^2$.

| Wood content (w %) | Masterbatch type | Masterbatch content (w %) | 20% EtOH (mg/dm$^2$) | 50% EtOH (mg/dm$^2$) | 3% Acetic acid (mg/dm$^2$) |
|---|---|---|---|---|---|
| 10 | White | 2 | <2 | <2 | <2 |
| 10 | Red | 0.5 | <2 | 3.8 | <2 |

Figure 3:
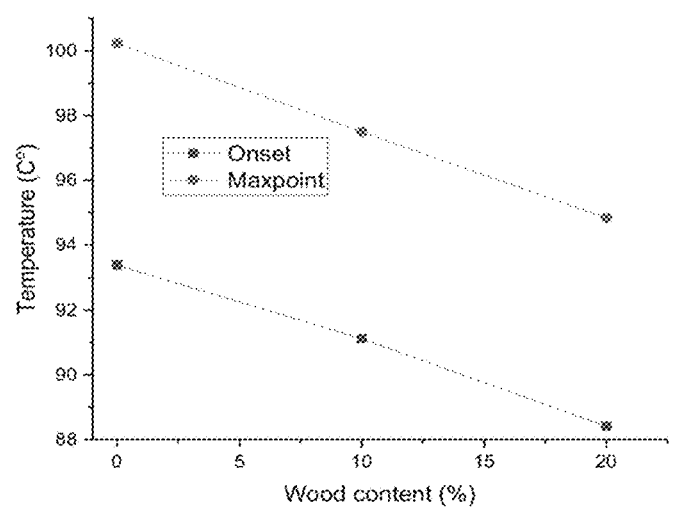
FIG. 3 is a graph showing the dependence of cold crystallization temperature on wood content with a constant heating rate of 10° C./min.

Differential scanning calorimetry (DSC) analyses were conducted on samples containing 0, 10 and 20 w % of wood to investigate whether the addition of wood has an effect on the crystallization behavior of the materials. The results (FIG. 3) show a clear indication that the addition of wood leads into a decrease in the cold crystallization time of the materials. FIG. 3 indicates the effect of wood content on the cold crystallization temperature of the material with a constant heating rate (10° C./min)

FIG. 3 shows a decrease in crystallization temperature because of the fact that cold crystallization starts right after $T_g$ is passed but enthalpy change in this kind of formation is under any detection limits.

Figure 4:
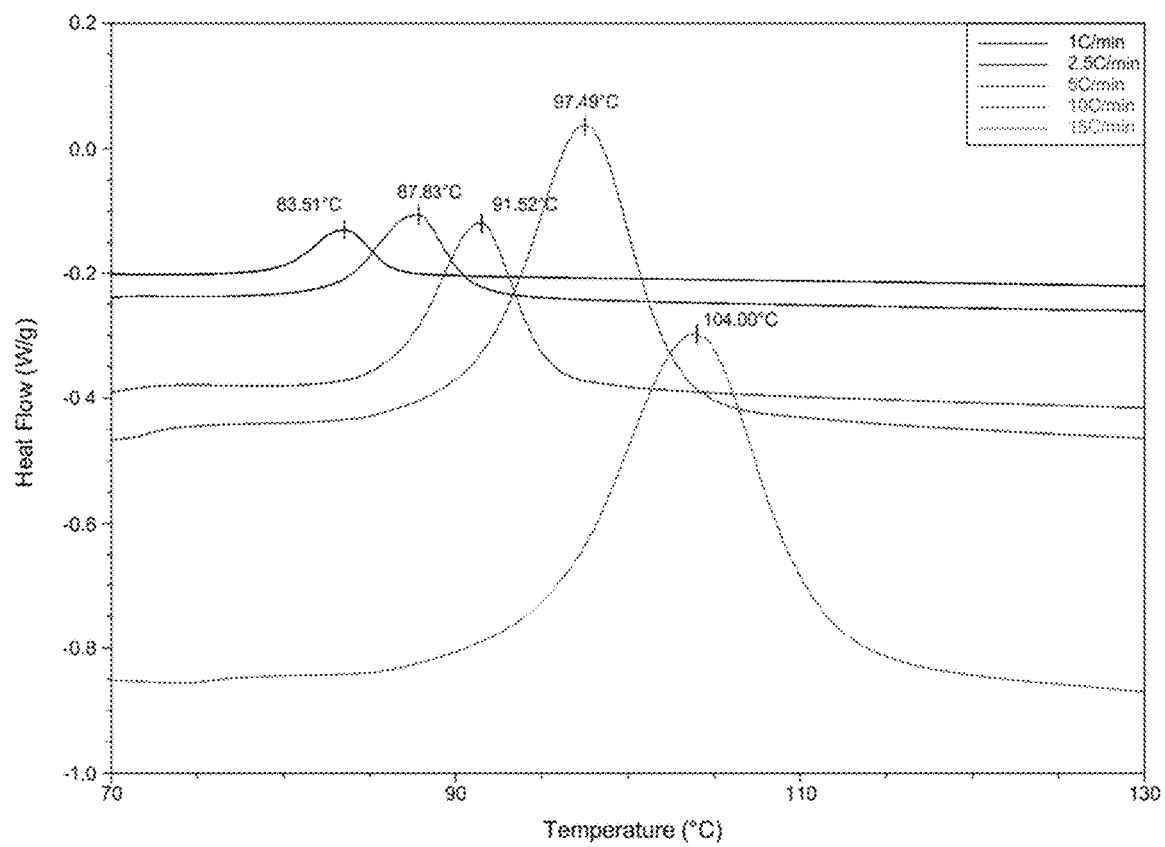
FIG. 4 is an overlay plot of thermograms showing a decrease in crystallization temperature as a function of heating rate.

FIG. 4 shows the effect of the heating rate on cold crystallization temperature of the material. As will appear, FIG. 4 shows that crystallization temperature decreased as a function of heating rate. Decrease of crystallization rate is due to the fact that the addition of wood increases the heterogeneous nucleation in the material (i.e., the wood fibers act as "impurities" in the polymer), decreasing the amount of the energy needed for the nucleation of the polymer. These results mean that it is not only the hydrophilicity and swelling behavior of the wood fibers which accelerates the biodegradation process of the composite, but it is also the changes in the nucleation behavior that accelerates the penetration of the water into the composite structure.

The mechanical properties of the material without wood fibers and material containing wood dust (20 w %) with a chip size less than 0.5 mm were determined according to ISO 527, ISO 178 and ISO 179.

The results (Table 4) demonstrate a significant improvement in the moduli of the material after the addition of wood fibers when compared with the material without wood. In addition to the betterment in the compostability and water absorption behavior, the inclusion of wood fibers improves the ductility of the material as well. A decrease in Charpy impact strength and tensile strain indicate that the addition of wood fibers makes the material more brittle, which can be considered as an advantage when the material is, for example, composted because it is easier to mechanically break the material into smaller fragments resulting in an accelerated rate of composting and degradation.

TABLE 4

Mechanical properties of samples containing 0 w % and 20 w % of wood particles with a chip size less than 0.5 mm.

| Wood content (w %) | Tensile strength (MPa) | Tensile modulus (GPa) | Tensile strain (%) | Flexural strength (MPa) | Flexural modulus (GPa) | Charpy impact strength (kJ/m$^2$) | Shore D hardness |
|---|---|---|---|---|---|---|---|
| 0 | 63.3 | 3.65 | 2.29 | 101.1 | 3.46 | 17.2 | 78 |
| 20 | 50.7 | 5.01 | 1.43 | 82.4 | 4.90 | 7.9 | 80 |

The water resistance of the thin-walled cup-like samples (FIG. 1) containing PLA, 25 w % of wood fibers (chip size less than 0.5 mm) and 2-4 w % of different additives was determined in in-house tests at room temperature by immersing the samples in water. The compositions of the samples are described in Table 5.

TABLE 5

The compositions of the thin-walled (1 mm) cup-like samples used in water absorption tests.

| Sample number | PLA content (w %) | Wood content (w %) | Additive | Additive content (w %) |
|---|---|---|---|---|
| 1 (reference) | 75 | 25 | — | — |
| 2 | 73 | 25 | Commercial slip additive 1 | 2 |
| 3 | 73 | 25 | Commercial slip additive 2 | 2 |
| 4 | 73 | 25 | Behenamide | 2 |
| 5 | 73 | 25 | Erucamide | 2 |
| 6 | 73 | 25 | Oleamide | 2 |
| 7 | 73 | 25 | Zinc stearate | 2 |
| 8 | 73 | 25 | MA-PLA | 2 |
| 9 | 71 | 25 | Slip additive 1 + MA-PLA | 2 + 2 |

The weight increase, disintegration, swelling and aesthetic properties of the samples were followed. Table 6 shows the effect of additives on the water resistance of the samples.

TABLE 6

The results from water immersion tests for the thin-walled cup-like samples. The difference to the reference sample (sample number 1) is expressed in brackets.

| Sample number | Weight increase after 3 days (%) | Weight increase after 7 days (%) | Weight increase after 14 days (%) | Notes |
|---|---|---|---|---|
| 1 | 10.9 | 12.8 | 13.6 | — |
| 2 | 7.4 (−32.6%) | 8.5 (−33.6%) | 9.4 (−30.3%) | — |
| 3 | 10.0 (−8.3%) | 11.4 (−11.0%) | 12.3 (−8.9%) | — |
| 4 | 8.7 (−19.9%) | 9.4 (−26.4%) | 9.5 (−30.2%) | Deformation detected |
| 5 | 7.3 (−33.5%) | 8.3 (−35.3%) | 8.8 (−35.2%) | — |
| 6 | 9.7 (−10.8%) | 11.3 (−11.5%) | 12.1 (−10.8%) | Cracking detected on one sample |
| 7 | 8.8 (−19.0%) | 9.8 (−23.6%) | 9.5 (−29.8%) | — |
| 8 | 8.5 (−21.7%) | 10.3 (−19.4%) | 10.7 (−21.3%) | — |
| 9 | 7.9 (−27.4%) | 8.9 (−30.1%) | 10.3 (−24.0%) | — |

The results presented in Table 6 demonstrate the positive effect of the additives on the water resistance of the material. Even though the ultimate goal is to make the material degrade as fast as possible, it is also important to have an ability to control the degradation speed, which leads to the possibility to finetune the properties of the composite according to different applications. This expands the number of products, in which this material could be used instead of common plastics.

Figure 5:
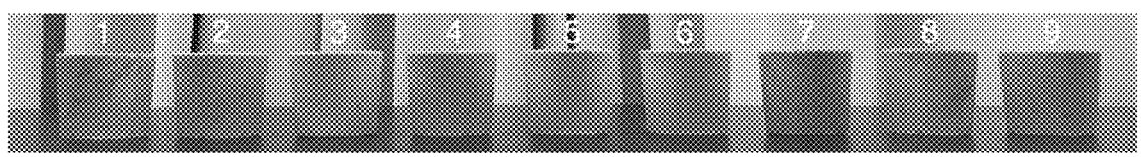
FIG. 5 is a collection of photographs showing the differences in wood fiber agglomeration between the samples containing various types of additives.

The processability of the compositions (Table 5) was also monitored during injection molding process. The addition of additives led to a considerable enhancement in the processability of the materials. FIG. 5 shows the differences between the fiber distribution within the samples without any additives (Sample number 1) and with additives (Sample numbers 2-9). It can be clearly seen that the inclusion of amide-based additives in the composition reduced the fiber agglomeration in the products. Similar enhancement could not be observed for sample containing 2 w % of MA-PLA, which is due to the fact MA-PLA only acts as a coupling agent, i.e., it forms a chemical bond between natural fibers and polymer matrix. It is typical that coupling agents do not have an effect on the friction of the material, i.e., they do not have a lubricating effect. Thus, a composition containing MA-PLA in combination with lubricant was tested (Sample 9), which resulted in more homogeneous distribution of the fibers within the sample.

The enhancement in the processability was also observed in injection molding parameters; the composition containing no lubricants (Samples 1 & 8) required approximately 1500-1600 bar injection pressure, whereas the samples containing lubricants (Samples 2-7 & 9) required about 20% less pressure (1200-1300 bar) to manufacture the product. The lower pressure also indicates that the friction generated during the process is less for the materials containing additives. This, in turn, results in lower frictional heat burden in the mass, allowing higher temperatures to be used in the process without causing thermal degradation to natural fibers because the residence time for the mass in the machine is lower. Higher processing temperatures reduce the viscosity of the mass, resulting in higher production output. In addition to the observations described above, the samples containing lubricants were easier to be ejected from the mold, indicating that the additives presented in this invention also acted as mold release agents.

The MFR of different materials were determined according to ISO 1133. The MFR of PLA at 190° C./2.16 kg was 22.9 g/10 min, whereas the corresponding values for PLA+20 w % wood particles (particle size less than 0.5 mm) and PLA+40 w % wood particles were 17.0 g/10 min and 7.8 g/10 min, respectively.

The density of the material is also an important measure especially when biodegradable materials are considered. Typically biodegradable polymers have higher density than water and most commonly used plastics (density of water is 1.0 g/cm$^3$ and density of common plastics is typically less than 1.0 g/cm$^3$). When these materials are wound up in the aquatic environments (e.g., lakes and seas), they sink instead of getting accumulated on the surface of the water. It is more probable that materials that sink are degraded more efficiently in the seas and lakes than those that remain on the surface of the water.

The densities of the materials presented in this invention were determined. The density of PLA was 1.287 g/cm$^3$, whereas the density of and PLA containing 20 w % wood was 1.272 g/cm$^3$. This demonstrates that the addition of wood does not have adverse effect on the sinkability of the material regardless of the reduction in the density.

The second example is an extruded product with a wall thickness of 0.3 mm or more. The wood content in the product varies between 10 w % and 20 w % and the biopolymer content varies between 70 w % and 90 w %. This product intended to be used be used as a drinking straw to replace plastic straws. The product is presented in FIG. 6. Similar to the cup-like product presented above, the overall migration values of the straws were determined according to EN 1186-9 and EN 1186-14. Since the use of straws lasts for a very short period of time, the duration of the tests was decreased to 6 hours and 24 hours at 40° C., which conforms the requirements given in EU regulation No 10/2011. Table 7 presents the results from the tests conducted for 6 hours at 40° C. and Table 8 presents the results from the tests conducted for 24 hours at 40° C. Water immersion for straws containing wood chips was significantly increased when compared with pure biopolymer straws (Table 9 and 10).

TABLE 7

Overall migration results (6 hours, 40° C.) for thin-walled straws (N = 3) with different wood contents. According to Regulation (EC) 10/2011 on plastic materials intended for food contact, overall migration should not exceed 10 mg/dm$^2$.

| Wood content (w %) | 20% EtOH (mg/dm$^2$) | 50% EtOH (mg/dm$^2$) | 3% Acetic acid (mg/dm$^2$) |
|---|---|---|---|
| 0 | <2 | <2 | <2 |
| 10 | <2 | <2 | <2 |
| 20 | <2 | <2 | <2 |

TABLE 8

Overall migration results (24 hours, 40° C.) for thin-walled straws (N = 3) with different wood contents. According to Regulation (EC) 10/2011 on plastic materials intended for food contact, overall migration should not exceed 10 mg/dm$^2$.

| Wood content (w %) | 20% EtOH (mg/dm$^2$) | 50% EtOH (mg/dm$^2$) | 3% Acetic acid (mg/dm$^2$) |
|---|---|---|---|
| 0 | <2 | <2 | <2 |
| 10 | <2 | <2 | <2 |
| 20 | <2 | <2 | <2 |

The results in Tables 7 and 8 show that migration limits were not exceeded for any simulant, thus confirming the food contact approval for this material for this specific application.

Thermal properties of the thin-walled extruded product were also determined with a similar manner to the injection molded products. The results were similar for both materials, i.e., the addition of wood fibers leads into a decrease in the cold crystallization time of the materials.

Mechanical tests for the extruded materials (wood content 10 w % and 20 w %) were conducted for both pipe-like products and for films that were cropped from the extruded pipes. In addition, to compare the results with already commercialized products, the tests were also conducted for commercial paper and plastic (PP/PE) straws. Table 9 presents the results from the tensile tests.

TABLE 9

The results from the tensile tests (23° C., 3 N/min) for two different films (N = 5) and already commercialized straw materials.

| Sample ID | Raw materials | Yield strength (MPa) | Fracture (MPa) | Elongation at brake (%) | Young's modulus (MPa) |
|---|---|---|---|---|---|
| Sample 1 | Biodegradable polymer + wood dust (10 w %) | 9.72 | 16.85 | 16.65 | 781.9 |
| Sample 2 | Biodegradable polymer + wood dust (20 w %) | 8.22 | 15.51 | 11.02 | 745.8 |
| Commercial 1 | PE/PP | 16.81 | 23.03 | 325.3 | 301.4 |
| Commercial 2 | Paper | n/a | 23.20 | 1.33 | n/a |

The results in Table 9 show that commercial non-degradable product has better elastic properties when compared with biodegradable compositions. Despite this, similar level of strength is achieved with biodegradable composites, showing that biodegradable materials can be utilized in the same applications. When compared with films cropped from paper straws, a considerable difference can be observed since the products made from paper do not exert any elastic behavior (Young's modulus or yield strength could not be determined).

In Table 10, the results from flexural tests are presented for materials containing 10 w % and 20 w % wood dust. Similar to the observations made for injection molded products, the addition of wood leads into a higher ductility of the materials, i.e., more force is required to bend the materials. However, when the wood content is decreased, more force is required to break the materials.

TABLE 10

The results from flexural tests for materials with wood contents of 10 w % and 20 w %. The tests were conducted according to ISO 178 with 80 mm samples, 64 mm span and using a tool where r = 5 mm. The rate of bending was 2 mm/min.

| Sample | Highest load (N) | Extension at highest load (mm) | Extension at brake (mm) |
|---|---|---|---|
| 10 w % wood | 7.3 | 4.8 | n/a |
| 20 w % wood | 12.4 | 3.5 | 6.9 |

Similar to the injection molded products, the properties of extruded materials can be modified according to the requirements of the application through addition of different additives, mixtures of biodegradable polymers and natural fibers. The results from these tests demonstrate the suitability of this material for, e.g., single-use products, such as drinking straws.

Figure 6:
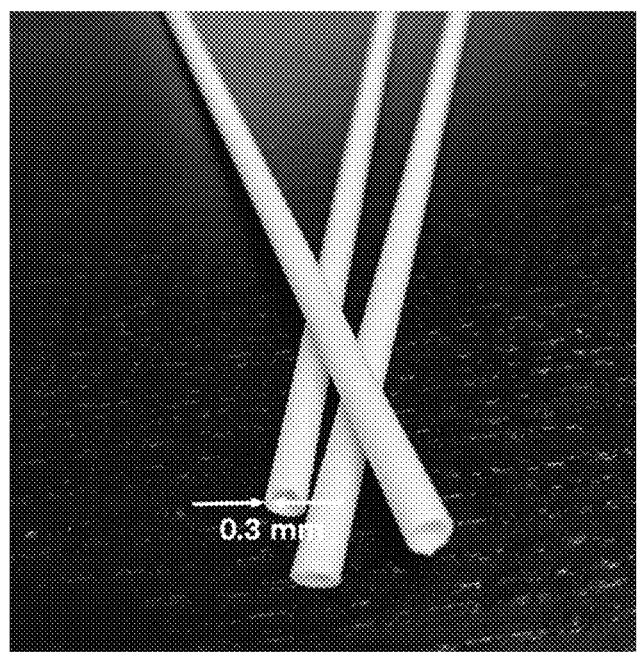
FIG. 6 is a photograph of a thin-walled pipe-like product manufactured by extrusion. The figure includes the physical dimensions for the product.

FIG. 6 shows thin-walled pipe-like product manufactured by extrusion. The wall thickness of the product is marked in the photograph. Water absorption of the thin-walled extruded products (FIG. 6) were determined by immersing the samples in water bath for four months. The compositions used in the tests are presented in Table 11. The results from the tests are presented in Table 12.

TABLE 11

The compositions of the thin-walled (1 mm) extruded products used in the water absorption tests.

| Sample number | PLA content (w %) | Wood content (w %) |
|---|---|---|
| 1 | 100 | 0 |
| 2 | 90 | 10 |
| 3 | 75 | 25 |
| 4 | 100 (blend) | 0 |

TABLE 12

The results from water immersion tests for the thin-walled extruded products.

| Sample number | Weight increase after 1 month (%) | Weight increase after 4 months (%) |
|---|---|---|
| 1 | 0.6 | 0.9 |
| 2 | 12 | 24.9 |

TABLE 12-continued

The results from water immersion tests for the thin-walled extruded products.

| Sample number | Weight increase after 1 month (%) | Weight increase after 4 months (%) |
|---|---|---|
| 3 | 23.5 | 27 |
| 4 | 1.0 | 1.1 |

Just as the results for the injection molded samples showed, an increase in wood fiber content results in higher water absorption values, which is an important asset when biodegradability is concerned. The water absorption values for biodegradable polymers without any hydrophilic components remained low, which explains why these materials degrade slowly in water.

INDUSTRIAL APPLICABILITY

The materials according to the present invention, as well as the above discussed embodiments, find a large number of applications, for instance as containers (jars, bottles, tubes . . . ) for cosmetics, foodstuff (cold and warm) and beverages (carbonated and non-carbonated). They can also be utilized as drinking cups for hot and cold drinks, plates, bowls, disposable cutlery, food trays, caps and closures for bottles and containers, drinking straws, cloth hangers, 3D printing etc. The present compositions can be processed by injection blow molding or by extrusion.

CITATION LIST

Patent Literature

JP4699568B2
US210071528B2
CN101429328A
US20030216492A1
U.S. Pat. No. 6,168,857B1
U.S. Pat. No. 5,738,921A
U.S. Pat. No. 8,455,575
EP2888323B1

The invention claimed is:
1. A composition comprising
a continuous thermoplastic polymer matrix having a melting point greater than 110° C., wherein, prior to processing, a thermoplastic polymer of the thermoplastic polymer matrix comprises a water content less than 0.05% of a total weight of the thermoplastic polymer, and
distributed within the matrix, particles of a hydrophilic natural fiber material having a sieved size of less than 1.0 mm, and having, prior to processing, a moisture content of less than 2% of a total weight of the natural fibers,
the weight ratio of the thermoplastic polymer to the hydrophilic natural fiber material particles being from 99:1 to 35:65, and wherein the composition is capable of being shaped into a sheet or plate having a total thickness of less than 1.0 mm, and
wherein the composition is configured such that upon contact with water a resulting swelling of the particles of the hydrophilic natural fiber material due to water absorption has enough force to form cracks into the polymer matrix and thereby accelerate biodegradation of the composition.

2. The composition according to claim 1, wherein the composition is shaped into a sheet or plate having a total thickness of 0.1 mm to 0.4 mm.

3. The composition according to claim 1, wherein the polymer matrix has a melt flow rate (MFR, 190° C./2.16 kg) between 1 and 70 g/10 min.

4. The composition according to claim 3, wherein the melt flow rate is between 1 and 50 g/10 min.

5. The composition according to claim 1, wherein the thermoplastic polymer has a melting point greater than 150° C.

6. The composition according to claim 1, wherein the thermoplastic polymer comprises a biodegradable polymer.

7. The composition according to claim 1, wherein the hydrophilic natural fiber material comprises a lignocellulosic material obtained from annual or perennial plants or wooden materials.

8. The composition according to claim 1, wherein the hydrophilic natural fiber material is selected from both softwood and hardwood.

9. The composition according to claim 1, wherein the weight ratio of thermoplastic polymer to wood particles is from 65:35 to 95:5.

10. The composition according to claim 1, further comprising one or more additives selected from the group consisting of metal stearates, maleic anhydride grafted thermoplastics, oleamides, erucamides, fatty acids, waxes, lignins and mixtures thereof, said one or more additives being included in an amount of up to 10 w %.

11. The composition according to claim 1, wherein the composite further comprises particles capable of conferring properties of color to the composite.

12. The composition according to claim 1, wherein the composite further comprises:
    particles selected from the group consisting of carbon black, titanium dioxide (TiO2), iron oxides, copper sulfates and carbonates, chromium oxides, cobalt based compounds, and calcium carbonates, or
    natural dyes, or
    combinations thereof.

13. The composition according to claim 1, wherein the natural fiber is from softwood of the *Pinus* or *Picea* species.

14. The composition according to claim 1, wherein the composition comprises recycled biodegradable polymers or natural fibers.

15. A hollow article comprising a composition according to claim 1.

16. The hollow article according to claim 15, wherein the composition comprises between 1 w % and 30 w % wood fibers, wherein the article comprises a wall, and wherein an overall migration level for 10 w % ethanol is less than 10 mg/dm2 for the wall.

17. The hollow article according to claim 15, wherein the composition comprises between 1 w % and 30 w % wood fibers, wherein the article comprises a wall, and wherein an overall migration level for 95 w % ethanol is less than 10 mg/dm2 for the wall.

18. The hollow article according to claim 15, composition comprises between 1 w % and 30 w % wood fibers, wherein the article comprises a wall, and wherein an overall migration level for 3 w % acetic acid is less than 10 mg/dm2 for the wall.

19. The hollow article according to claim 15, wherein the density of the composite material is between 0.8 and 1.4 g/cm3.

20. The hollow article according to claim 15, wherein the Shore D hardness of the composite material is between 60 and 90.

21. The hollow article according to claim 15, wherein the article comprises a bottle having a wall thickness between 0.1 mm and 5 mm.

22. The hollow article according to claim 15, wherein the article comprises a wall thickness from 0.3 mm to 1.5 mm.

23. The composition according to claim 6, wherein the biodegradable polymer is selected from the group consisting of polyester, polylactide, poly(lactic acid), polyglycolide, poly(glycolic acid), cellulose acetate propionate, and a polyhydroxyalkanoate.

24. The hollow article according to claim 15, wherein the hollow article comprises a drinking straw.

25. A composition comprising:
    a continuous thermoplastic polymer matrix having a melting point greater than 110° C. and,
    distributed within the matrix, particles of hydrophilic natural fiber material having a sieved size of less than 1.0 mm, wherein:
        the weight ratio of the thermoplastic polymer to the hydrophilic natural fiber material particles being from 99:1 to 35:65,
        the thermoplastic polymer is a biodegradable polymer or biopolymer, and
        before processing the moisture content of natural fibers is less than 2% of the total weight of the natural fibers, and before processing the water content of thermoplastic polymer is less than 0.05% of the total weight of the biodegradable polymer or biopolymer, and
        the composition is capable of being shaped into a sheet or plate having a total thickness of less than 1.0 mm, wherein the composition is configured such that upon contact with water a resulting swelling of the hydrophilic natural fiber material particles has enough force to form cracks into the polymer matrix and thereby accelerate biodegradation of the composition.

26. The composition according to claim 1, wherein the polymer matrix comprises polylactic acid in a semi-crystalline form.

* * * * *